(12) United States Patent
Caveney et al.

(10) Patent No.: US 7,520,476 B2
(45) Date of Patent: Apr. 21, 2009

(54) CABLE SUPPORT SYSTEM

(75) Inventors: Jack E. Caveney, Hinsdale, IL (US); Victor D. Potter, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 487 days.

(21) Appl. No.: 10/316,436

(22) Filed: Dec. 11, 2002

(65) Prior Publication Data
US 2004/0113024 A1 Jun. 17, 2004

(51) Int. Cl.
*F16L 3/00* (2006.01)
(52) U.S. Cl. .............................. 248/72; 248/73; 248/59
(58) Field of Classification Search ................... 248/72, 248/73, 58, 59, 65, 68.1, 63
See application file for complete search history.

(56) References Cited

U.S. PATENT DOCUMENTS

| | | | | |
|---|---|---|---|---|
| 799,092 A | * | 9/1905 | Rosenfeld | |
| 806,192 A | * | 12/1905 | Russell | |
| 887,272 A | * | 5/1908 | Robinson | |
| 1,132,999 A | * | 3/1915 | Beers | |
| 2,285,632 A | * | 6/1942 | Urbain | 211/60 |
| 3,506,227 A | * | 4/1970 | Jenkins | 248/59 |
| 4,039,131 A | | 8/1977 | Perrault et al. | 248/73 |
| 4,709,888 A | * | 12/1987 | Cubit et al. | 248/73 |
| 5,740,994 A | | 4/1998 | Laughlin | 248/68.1 |
| 5,782,447 A | * | 7/1998 | Hoffend | 248/227.1 |
| 5,961,081 A | | 10/1999 | Rinderer | 248/68.1 |
| 5,988,570 A | | 11/1999 | Gretz | 248/74.2 |
| 6,086,030 A | * | 7/2000 | Hepworth | 248/215 |
| 6,311,851 B1 | * | 11/2001 | Knudsen, Sr. et al. | 211/13.1 |
| 6,332,594 B2 | | 12/2001 | Shelton et al. | 248/65 |
| 6,565,048 B1 | | 5/2003 | Meyer | 248/58 |

* cited by examiner

*Primary Examiner*—J. Allen Shriver
*Assistant Examiner*—Steven Marsh
(74) *Attorney, Agent, or Firm*—Robert A. McCann; Christopher S. Clancy

(57) ABSTRACT

A cable support system is disclosed. The cable support system includes a hanger plate securable to a structure, a chaining plate attachable to the hanger plate, and a cable support member attachable to the hanger plate or the chaining plate.

48 Claims, 17 Drawing Sheets

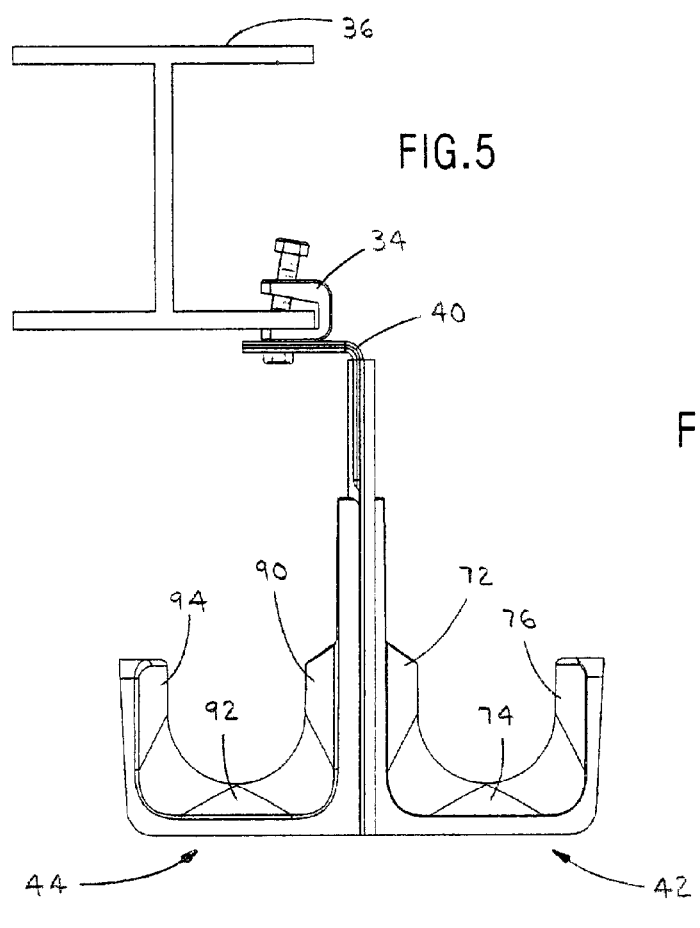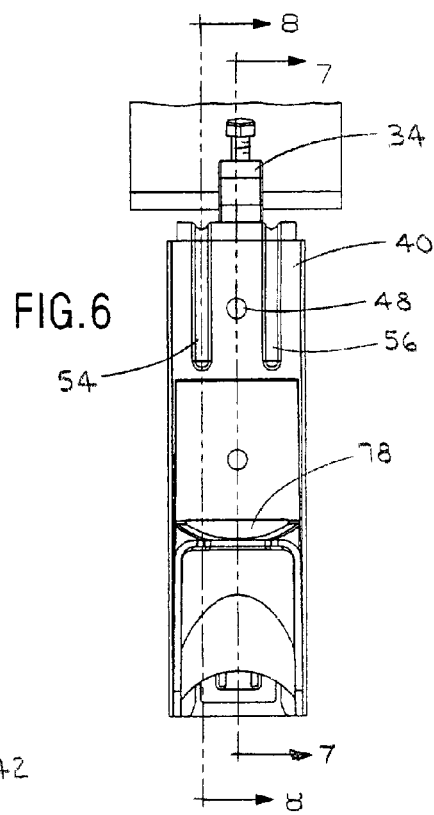

US 7,520,476 B2

CABLE SUPPORT SYSTEM

BACKGROUND OF THE INVENTION

The present invention is directed to a cable support system, and more particularly, to a multi-tiered system for supporting high-performance cabling.

Multi-tiered systems for supporting high-performance cabling have been used in the telecommunications industry. However, none of the prior cable support systems provide the ability to add additional cable support members to the cable support system after the initial installation is complete. For example, Erico's CableCat™, as shown and described in U.S. Pat. No. 5,740,994, utilizes two four saddle support assemblies shown at 170 and 171 formed on the brackets 150. Adding additional cable support members to each assembly after the initial installation is complete would require disassembly and removal of saddle support assembly 170 or 171 from the bracket 150, and replacement of bracket 150 with a larger bracket that would accommodate a six, or more, saddle support assembly. Moreover, if only two cable supports 30 are positioned in back-to-back alignment on saddle support assembly 170 or 171, bracket 150 will have unused capacity, which may never be needed.

It would be desirable to provide a multi-tiered cable support system having the ability to add additional cable support members to the cable support system after the initial installation is complete, without removing the cable support members from the hanger plate and replacing the hanger plate with a larger hanger plate.

It would also be desirable to provide an efficient cable support system that utilizes current cable support member capacity, while providing the ability to increase capacity after initial installation.

SUMMARY OF THE INVENTION

A cable support system is disclosed. The cable support system includes a hanger plate securable to a structure, a first chaining plate attachable to the hanger plate, and a first cable support member attachable to the hanger plate or the first chaining plate. Preferably, a second chaining plate is attachable to the first chaining plate.

Preferably, a second cable support member is positioned in back-to-back alignment with the first cable support member on the hanger plate or the first chaining plate. Moreover, a third cable support member is positioned in vertical alignment with the first cable support member or the second cable support member.

Preferably, a second cable support member is positioned in vertical alignment with the first cable support member on the hanger plate or the first chaining plate. Moreover, a third cable support member is positioned in back-to-back alignment with the first cable support member or the second cable support member.

Preferably, the hanger plate accommodates at least three cable support members. Likewise, the first chaining plate accommodates at least three cable support members.

Preferably, each of the cable support members has a slot for routing a cable retainer, such as a cable tie, around each cable support member to secure cables therein. Moreover, the support surface of each cable support member has two slots for routing a cable retainer, such as a cable tie, within each cable support member to secure cables therein.

BRIEF DESCRIPTION OF THE FIGURES

FIG. 5 is a side view of the cable support system of FIG. 2;

FIG. 6 is a front view of the cable support system of FIG. 2;

DETAILED DESCRIPTION OF THE PREFERRED EMBODIMENTS

The illustrated embodiments of the invention are directed to a multi-tiered cable support system 30 for supporting high-performance cables 32.

Figure 1:
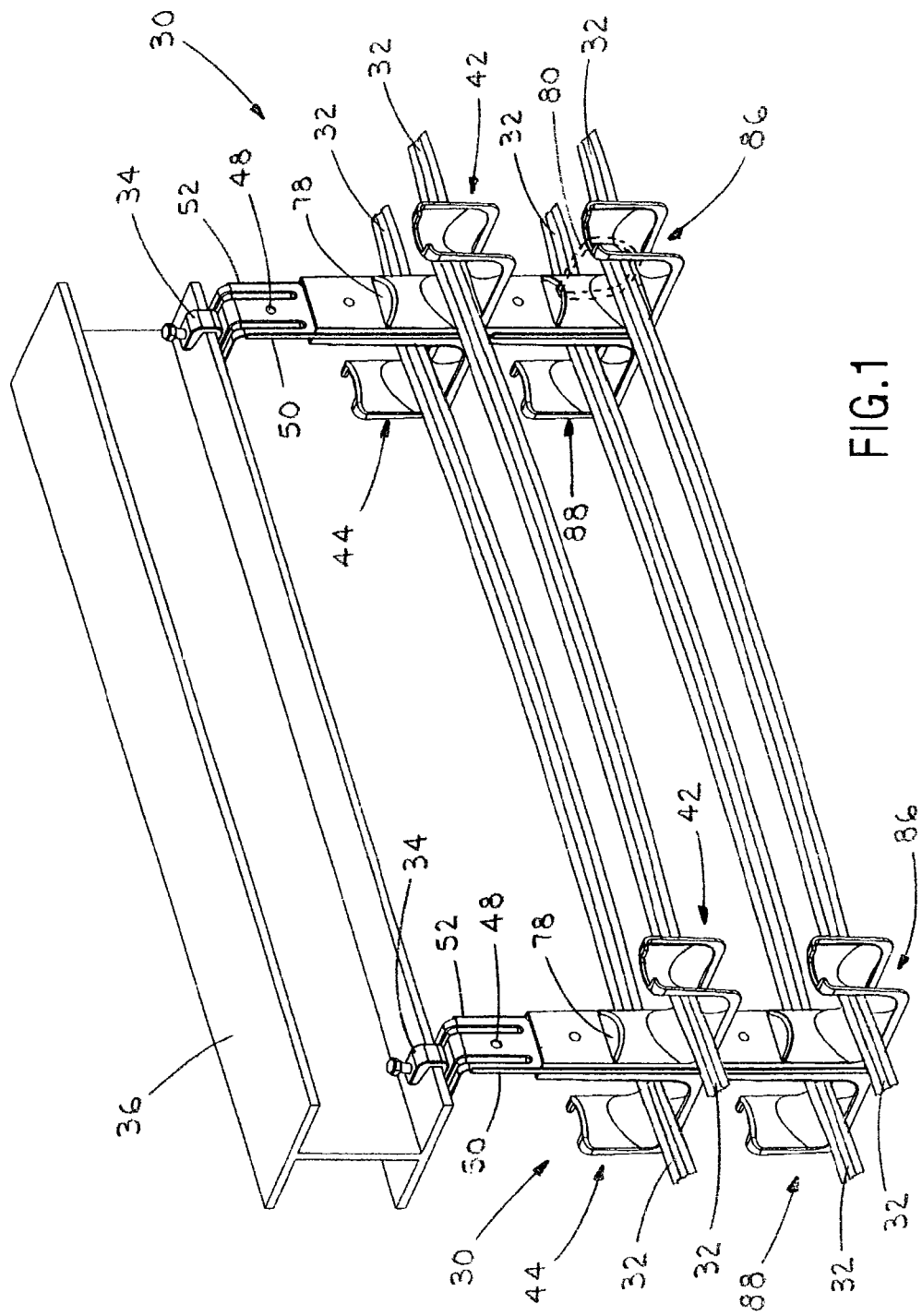
FIG. 1 is a front perspective view of two multi-tiered cable support systems according to the present invention, secured to an I-beam.
Figure 20:
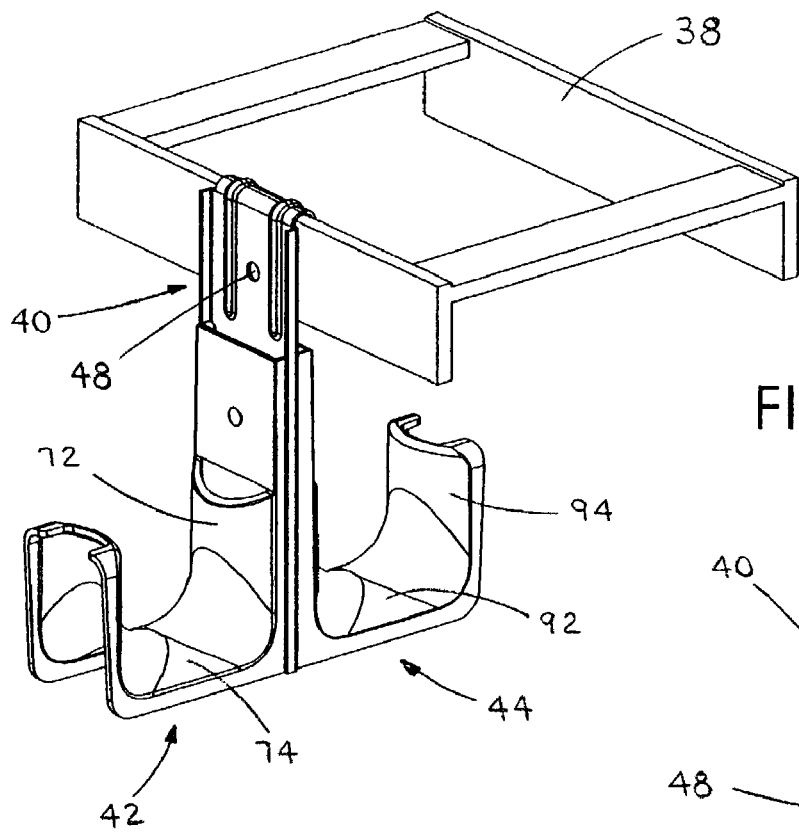
FIG. 20 is a front perspective view of a portion of the cable support system of FIG. 1, secured to a ladder rack.

FIG. 1 shows two multi-tiered cable support systems 30 secured to a fastener, such as I-beam clamp bracket 34. The I-beam clamp bracket 34 is attached to a structure, such as I-beam 36. As shown in FIG. 20, cable support system 30 may be attached directly to a structure, such as ladder rack 38. However, it is likewise contemplated that cable support system 30 may be secured directly to any fastener or structure, including but not limited to a threaded rod, a screw-on beam clamp bracket, a hammer-on beam clamp bracket, a C-purlin bracket, a Z-purlin bracket, a drop wire bracket, a floor support post bracket, a ladder rack bracket, a joist, a ceiling or a wall.

Figure 2:
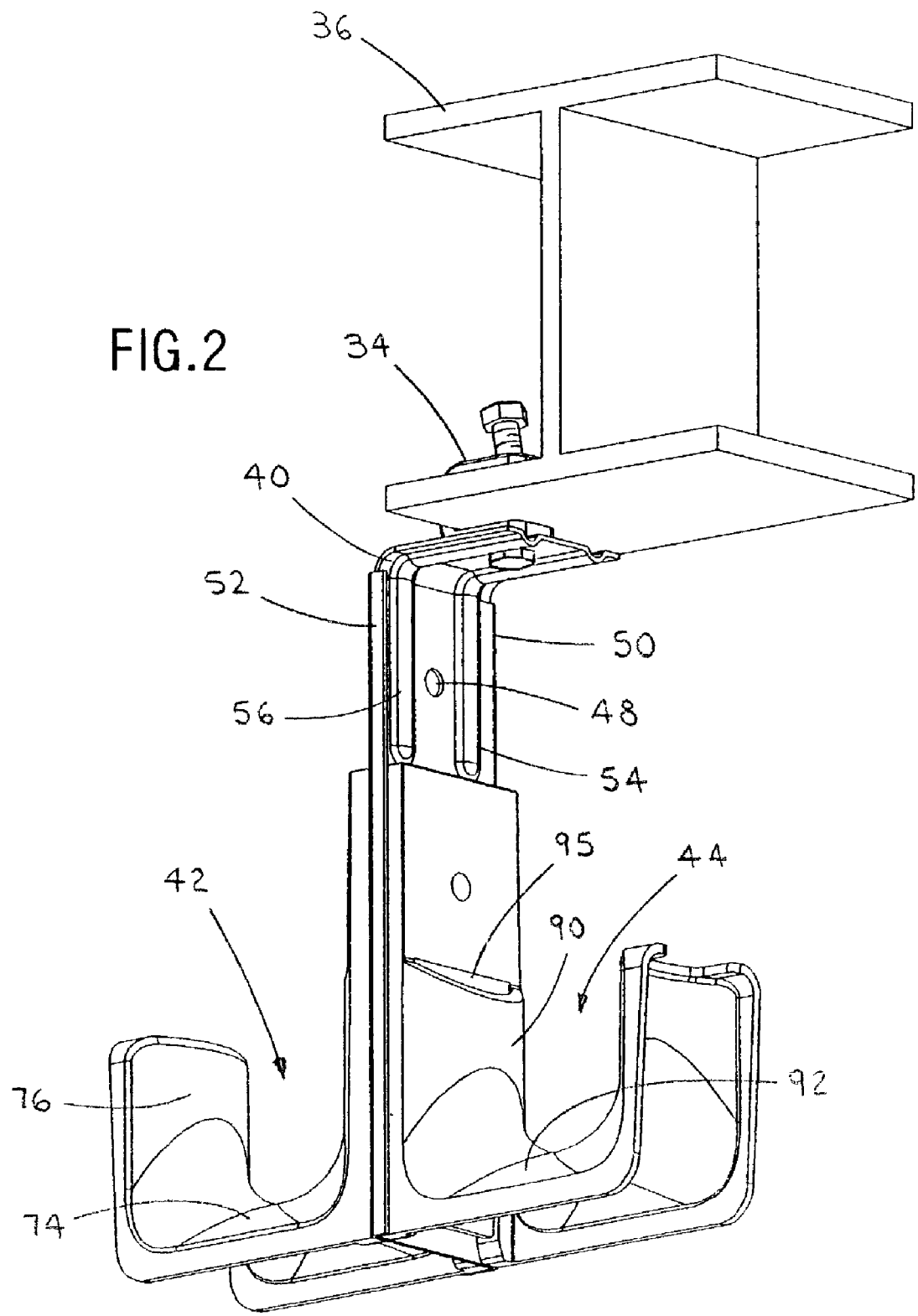
FIG. 2 is a rear perspective view of a portion of the cable support system of FIG. 1.
Figure 3:
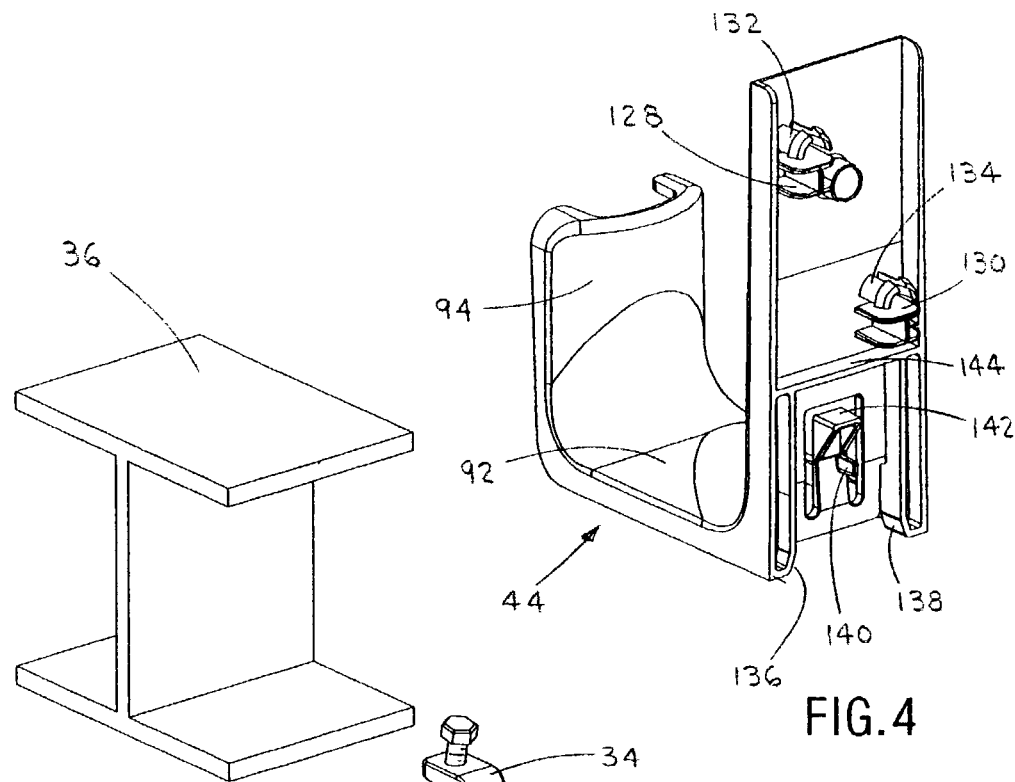
FIG. 3 is an exploded perspective view of the cable support system of FIG. 2.
Figure 4:
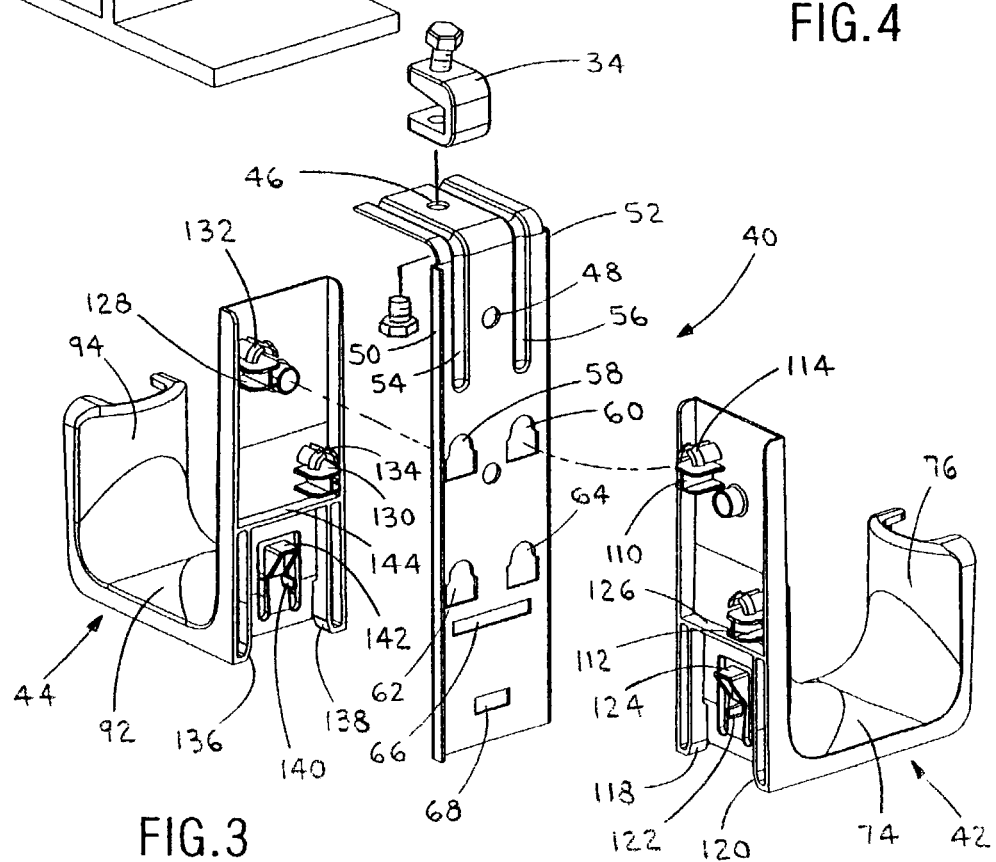
FIG. 4 is an enlarged perspective view of the cable support member of FIG. 3.

FIG. 2 shows the top tier of the cable support system 30 of FIG. 1, and FIG. 3 shows an exploded view of FIG. 2. As shown in FIG. 3, cable support system 30 includes hanger plate 40 and two cable support members, first cable support member 42 and second cable support member 44. Preferably, second cable support member 44 is substantially identical to first cable support member 42. Moreover, hanger plate 40 is metal, and first and second cable support members 42, 44 are plastic. However, it is likewise contemplated that the hanger plate and cable support members can be made of various materials.

Figure 22:
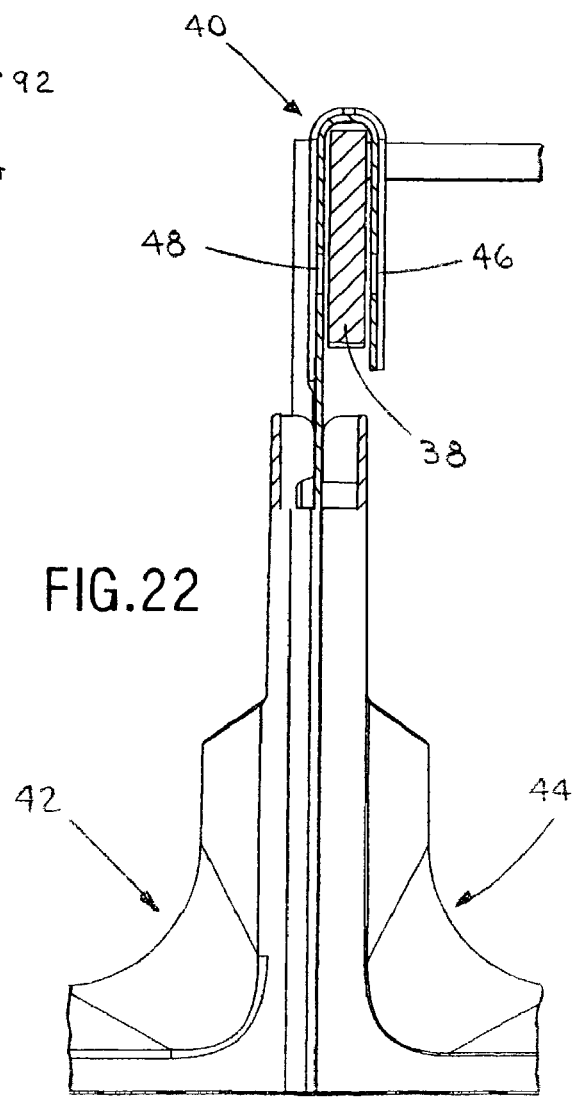
FIG. 22 is a side view of the cable support system of FIG. 20.

As shown in FIG. 3, hanger plate 40 includes a first aperture 46 for securing hanger plate 40 to a fastener, such as I-beam clamp bracket 34. Hanger plate 40 also includes a second aperture 48 for securing hanger plate 40 directly to a structure, such as ladder rack 38, as shown in FIGS. 20 and 22. As shown in FIGS. 2 and 3, hanger plate 40 includes flanges 50, 52 and beads 54, 56 for adding strength and rigidity to hanger plate 40.

Figure 13:
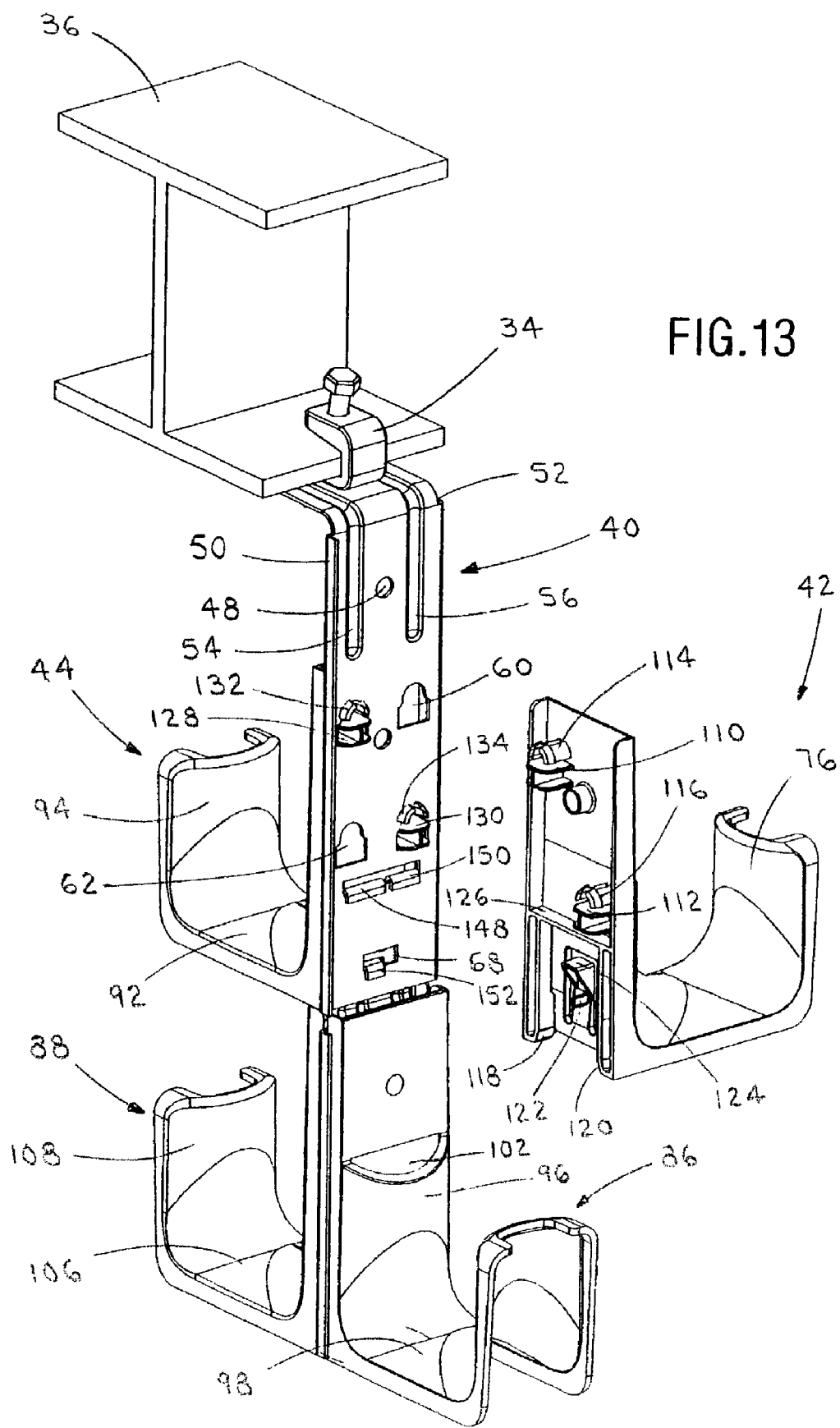
FIG. 13 is a partial exploded perspective view of the cable support system of FIG. 10.

As further shown in FIG. 3, hanger plate 40 includes four openings 58, 60, 62, 64 for receiving first cable support member 42 and second cable support member 44. Preferably, openings 58, 60, 62, 64 are substantially identical. Hanger plate 40 also includes slots 66, 68 for receiving at least one hook from chaining plate 70, as shown in FIG. 13. Preferably, slot 66 is wider than slot 68 because slot 66 receives two separate hooks, while slot 68 only receives one hook.

As shown in FIG. 5, first cable support member 42 includes mounting surface 72, support surface 74 and retention surface 76. Each surface provides bend radius control for cables 32 passing therealong. First cable support member 42 provides bend radius control in three directions and two planes. Specifically, mounting surface 72 and retention surface 76 provide horizontal bend radius control, and support surface 74 provides vertical bend radius control. Moreover, as shown in FIGS. 1 and 6, first cable support member 42 has a slot 78 for routing a cable retainer, such as cable tie 80, around first cable support member 42 to secure cables 32 therein.

Figure 10:
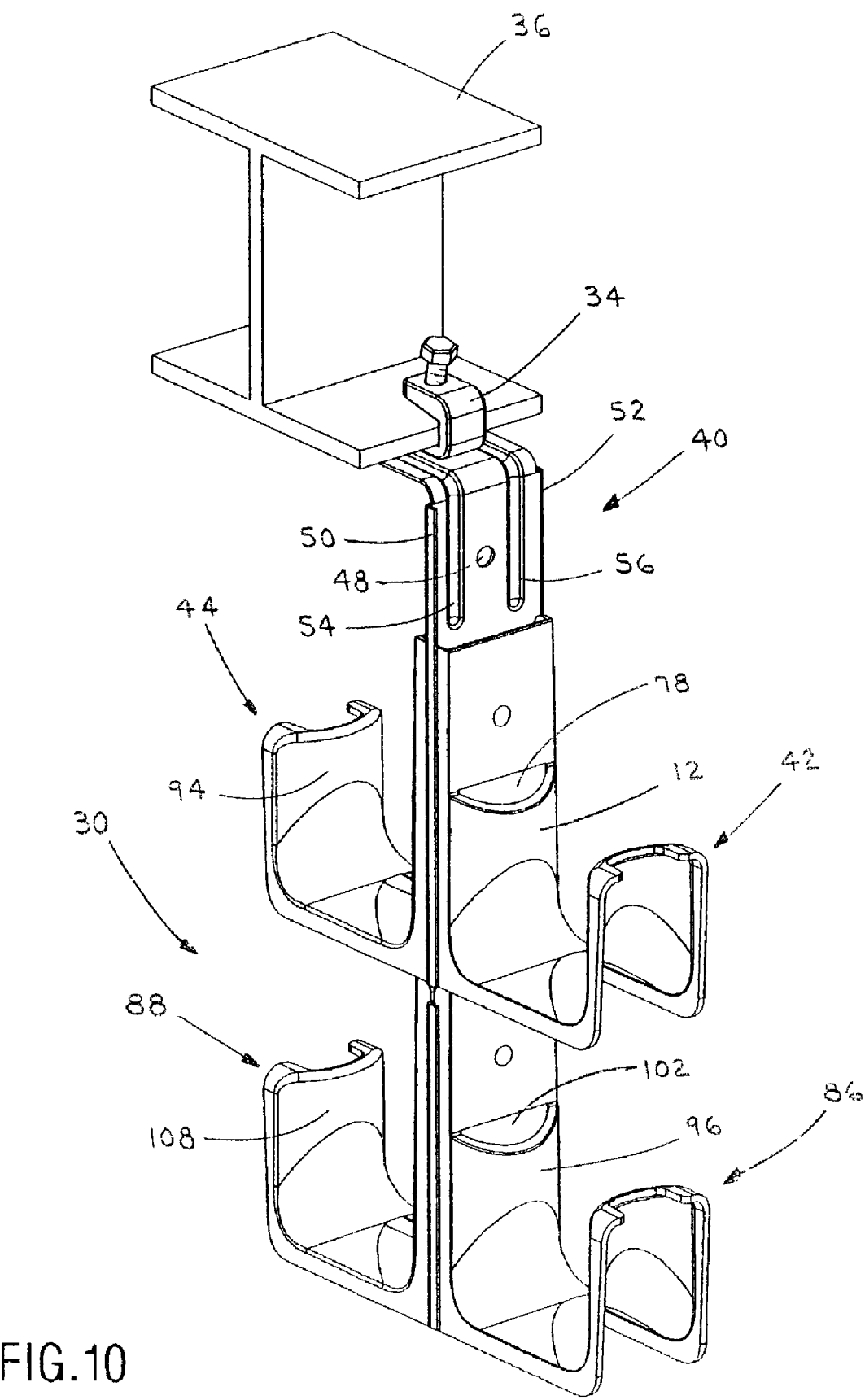
FIG. 10 is a front perspective view of a multi-tiered cable support system according to the present invention, secured to an I-beam.
Figure 11:
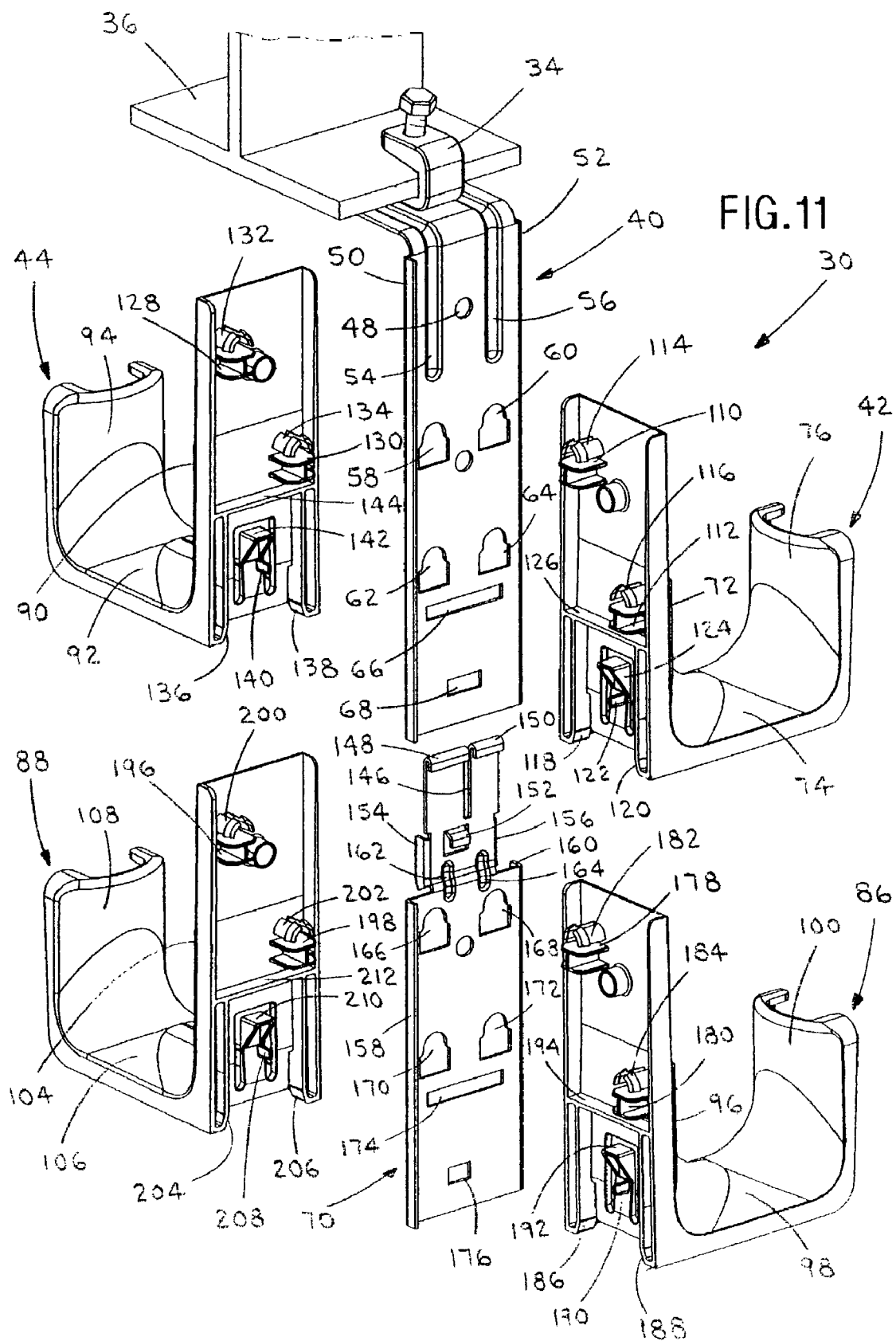
FIG. 11 is an exploded perspective view of the cable support system of FIG. 10.

Second cable support member 44, third cable support member 86 and fourth cable support member 88 are identical to first cable support member 42 and, thus, each cable support member possesses the same features. For example, as shown in FIGS. 2 and 5, second cable support member 44 includes mounting surface 90, support surface 92, retention surface 94 and slot 95. Likewise, as shown in FIGS. 10 and 11, third cable support member 86 includes mounting surface 96, support surface 98, retention surface 100 and slot 102. Moreover, fourth cable support member 88 includes mounting surface 104, support surface 106, retention surface 108 and slot 109 (see FIGS. 16-18).

As best seen in FIG. 3, first cable support member 42 includes annular snaps 110, 112 and I-beam structures 114, 116. Annular snaps 110, 112 engage hanger plate 40 and retain first cable support member 42 on hanger plate 40. Annular snaps 110, 112 restrict the horizontal movement of first cable support member 42 within openings 60, 62, respectively. Moreover, I-beam structures 114, 116 restrict the vertical movement of first cable support member 42 within openings 60, 62, respectively, and provide strength and support for first cable support member 42 when under a vertical load. First cable support member 42 also includes lead-in channels 118, 120, rib 122, latch 124 and stop 126.

As also shown in FIG. 3, second cable support member 44 includes annular snaps 128, 130 and I-beam structures 132, 134. Annular snaps 128, 130 engage hanger plate 40 and retain second cable support member 44 on hanger plate 40. Annular snaps 128, 130 restrict the horizontal movement of second cable support member 44 within openings 58, 64, respectively. Moreover, I-beam structures 132, 134 restrict the vertical movement of second cable support member 44 within openings 58, 64, respectively, and provide strength and support for second cable support member 44 when under a vertical load.

Second cable support member 44 also includes lead-in channels 136, 138, rib 140, latch 142 and stop 144. As shown in FIG. 11, lead-in channels 136, 138 funnel chaining plate 70 into proper alignment with hanger plate 40. As a result, rib 140 engages slot 146. If chaining plate 70 is inserted with hooks 148, 150, 152 facing rib 140, rib 140 will not engage slot 146. Thus, the slot and rib configuration prevents chaining plate 70 from being improperly installed.

Figures 16, 17:
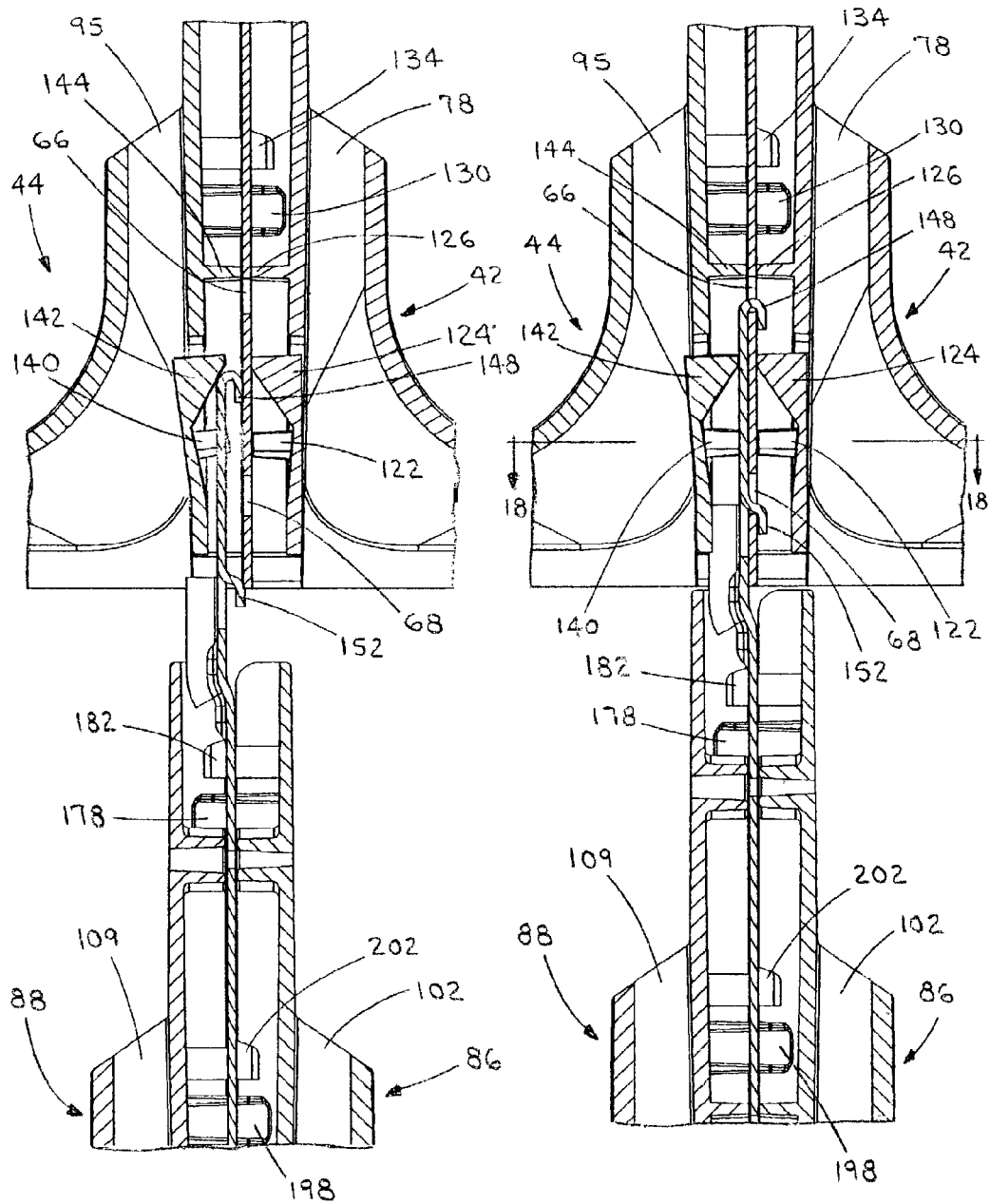
FIG. 16 is a cross-sectional view similar to FIG. 15, during insertion of the chaining plate into the hanger plate.
FIG. 17 is a cross-sectional view similar to FIG. 15, after insertion of the chaining plate into the hanger plate.

As best seen in FIGS. 16 and 17, latch 142 facilitates engagement between chaining plate 70 and hanger plate 40. As chaining plate 70 moves toward hanger plate 40, latch 142 provides a spring pressure which pushes hooks 148, 150 into slot 66 and hook 152 into slot 68. Moreover, second cable support member 44 has a stop 144 for guiding hooks 148, 150 into slot 66.

Figure 7:
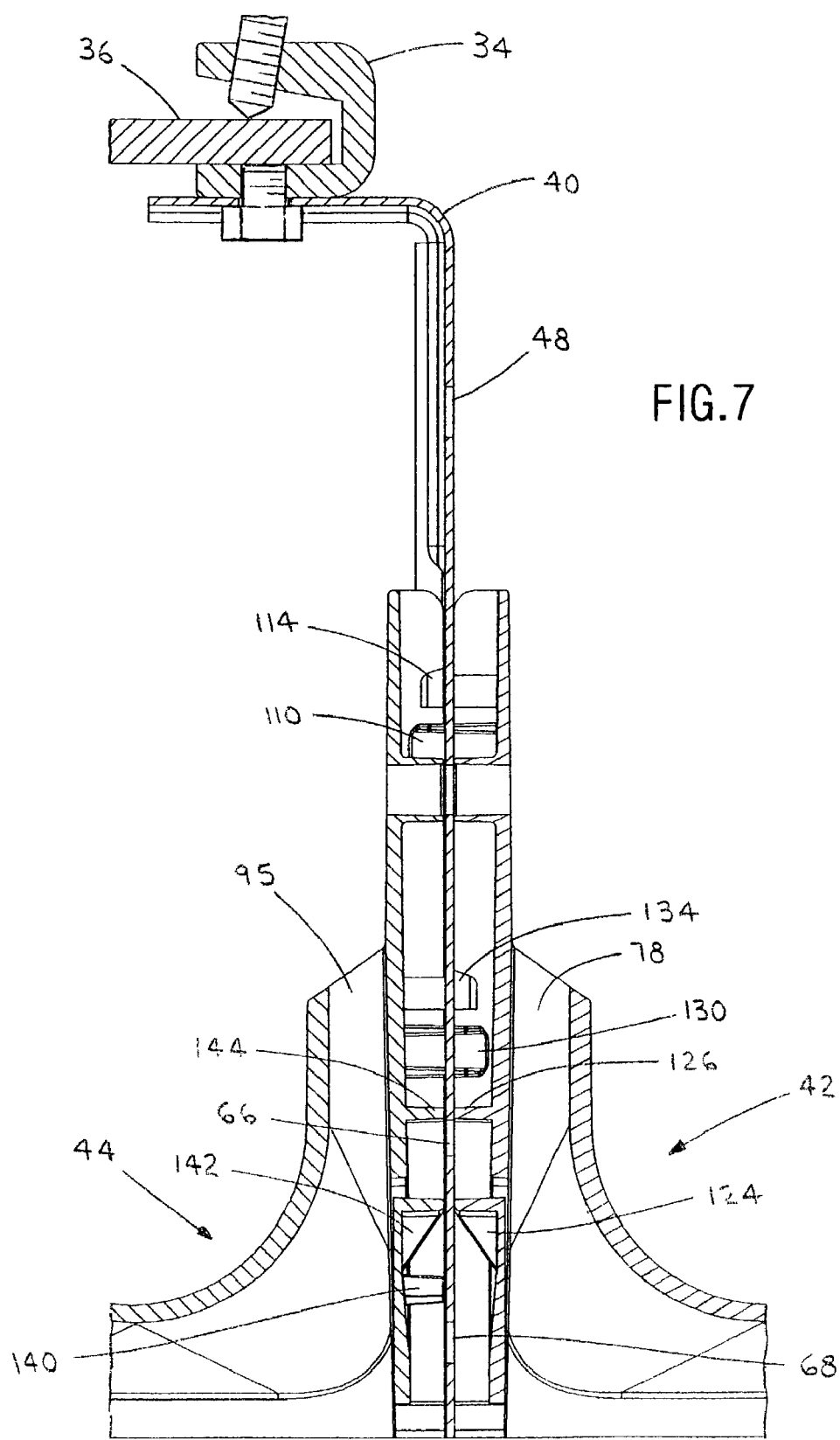
FIG. 7 is a cross-sectional view taken along lines 7-7 of FIG. 6.
Figure 9:
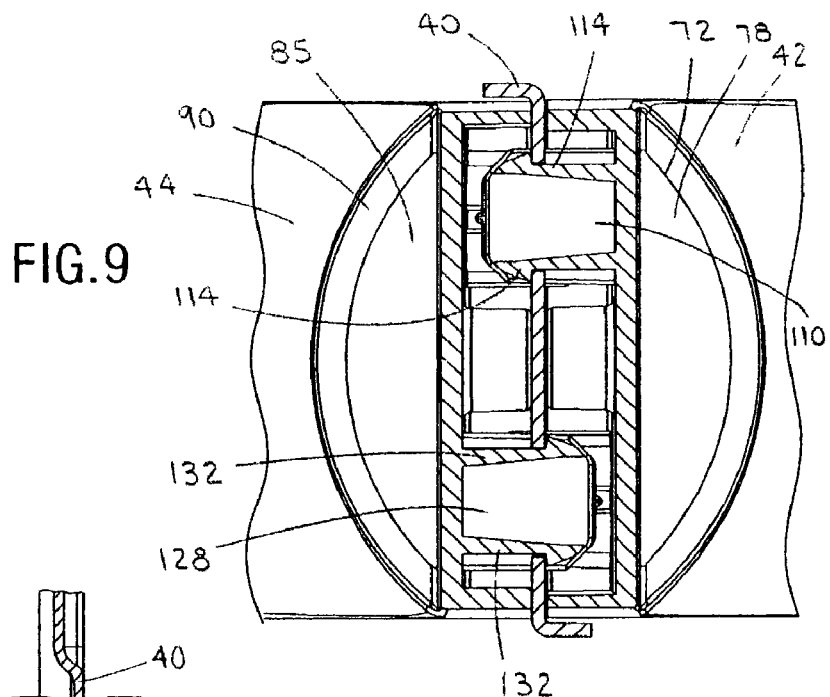
FIG. 9 is a cross-sectional view taken along lines 9-9 of FIG. 8.
Figure 8:
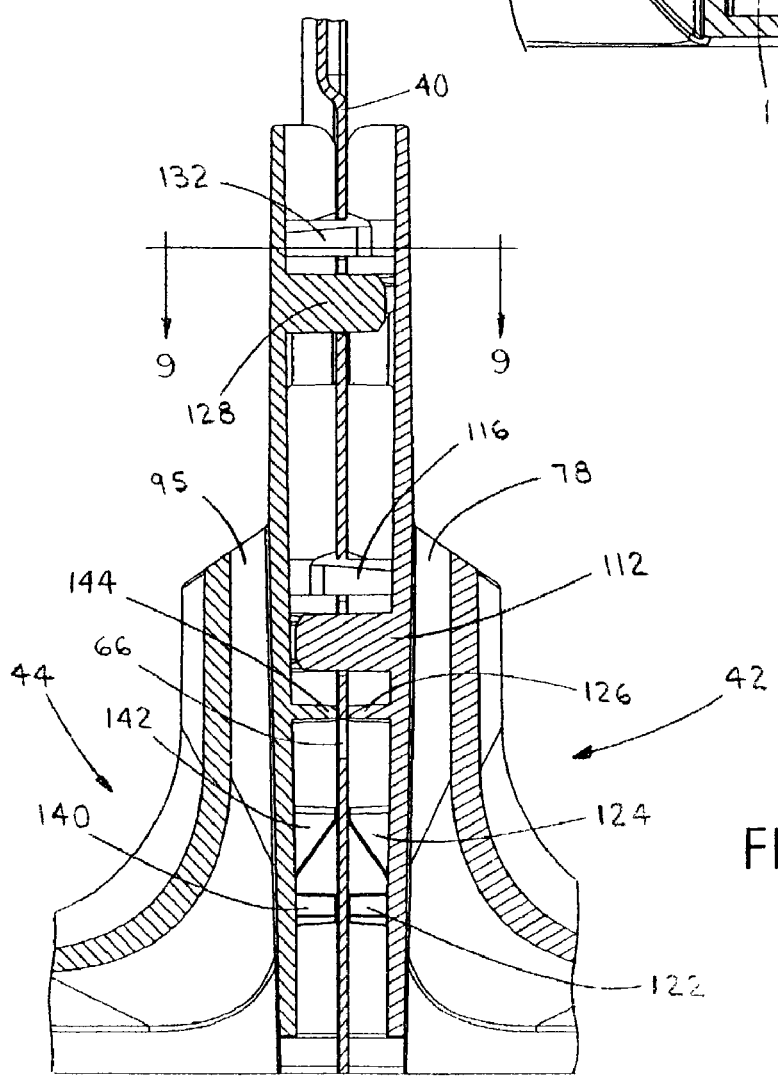
FIG. 8 is a cross-sectional view taken along lines 8-8 of FIG. 6.

FIGS. 7-9 show cross-sectional views of first cable support member 42 and second cable support member 44 secured to hanger plate 40 in back-to-back alignment. As shown in FIG. 7, annular snap 110 and I-beam structure 114 are secured within opening 60. Likewise, annular snap 130 and I-beam structure 134 are secured within opening 64. Moreover, as shown in FIG. 8, annular snap 128 and I-beam structure 132 are secured within opening 58. Likewise, annular snap 112 and I-beam structure 116 are secured within opening 62.

Figure 19:
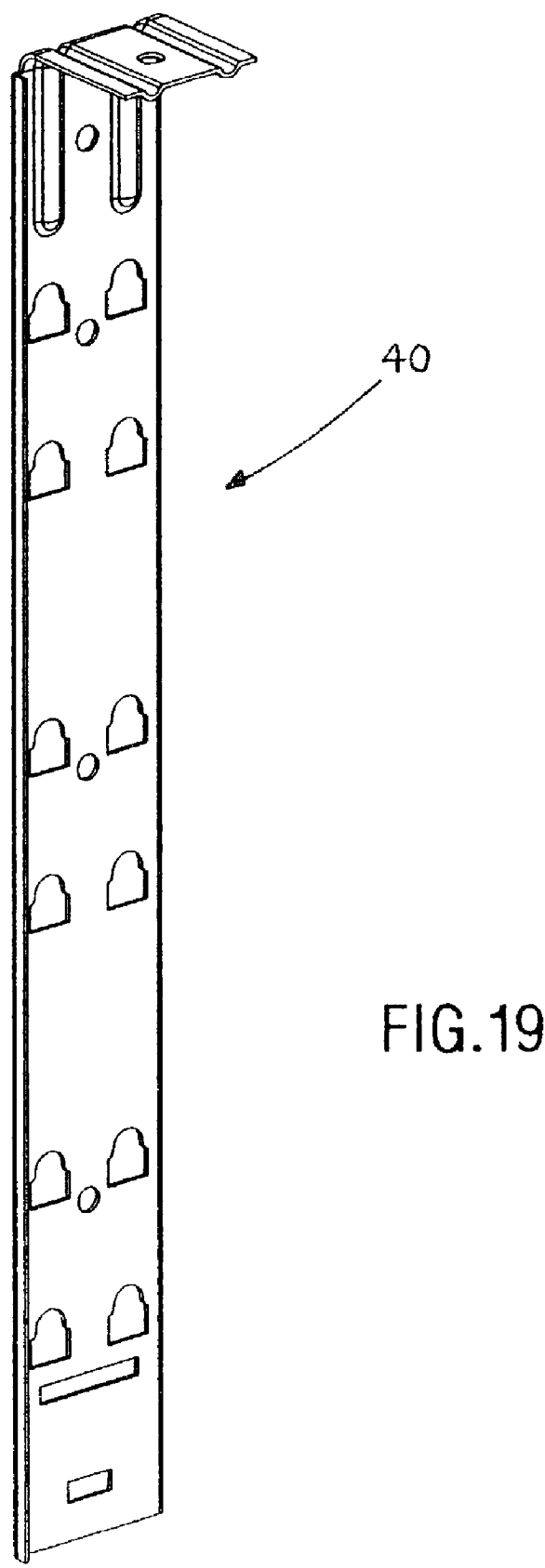
FIG. 19 is an alternate embodiment of the hanger plate shown in FIG. 3.

FIGS. 10-13 show cable support system 30 secured to I-beam 36 via I-beam clamp bracket 34. Cable support system 30 includes first cable support member 42 and second cable support member 44 secured to hanger plate 40, and third cable support member 86 and fourth cable support member 88 secured to chaining plate 70. However, as shown in FIG. 19, hanger plate 40 may be three-tiered, accommodating up to six cable support members. It is likewise contemplated that hanger plate 40 may be two-tiered, four-tiered, etc., to accommodate any number of cable support members. It is also contemplated that chaining plate 70 may be two-tiered, three-tiered, etc., to accommodate any number of cable support members.

As shown in FIG. 11, chaining plate 70 includes hooks 148, 150, 152 for engaging slots 66, 68 in hanger plate 40. As best seen in FIG. 13, hooks 148, 150 engage slot 66, and hook 152 engages slot 68. Chaining plate 70 also includes flanges 154, 156, 158, 160 and beads 162, 164 for adding strength and rigidity to chaining plate 70.

Figure 12:
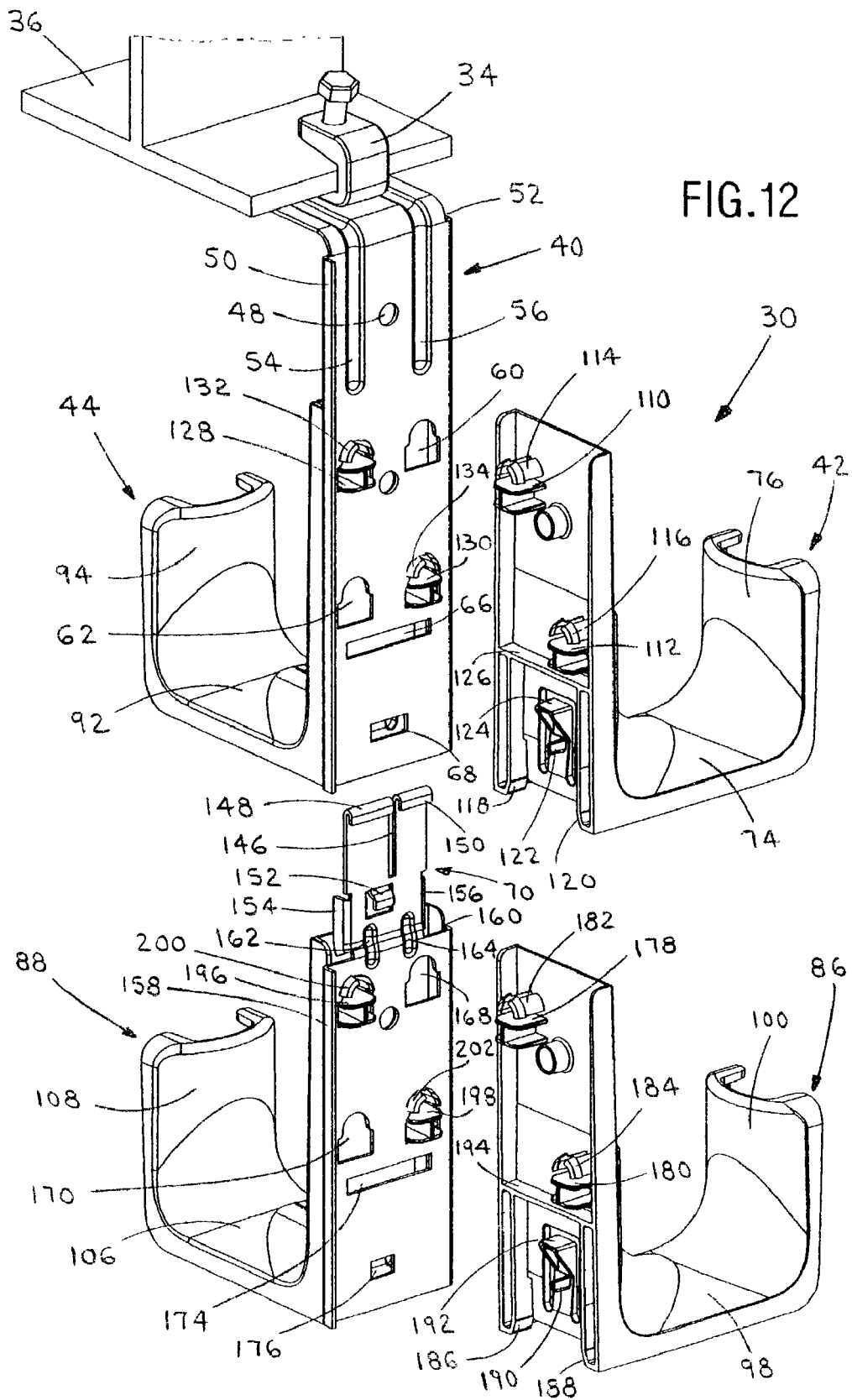
FIG. 12 is a partial exploded perspective view of the cable support system of FIG. 10.

As also shown in FIG. 11, chaining plate 70 includes openings 166, 168, 170, 172 for receiving third cable support member 86 and fourth cable support member 88, as shown in FIGS. 12 and 13. Preferably, openings 166, 168, 170, 172 are substantially identical. Moreover, chaining plate 70 includes slots 174, 176 for receiving hooks from a second chaining plate (not shown). The second chaining plate is substantially identical to chaining plate 70. Preferably, slot 174 is wider than slot 176 because slot 174 receives two separate hooks, while slot 176 only receives one hook.

As further shown in FIG. 11, third cable support member 86 includes annular snaps 178, 180 and I-beam structures 182, 184. Annular snaps 178, 180 engage chaining plate 70 and retain third cable support member 86 on chaining plate 70. Annular snaps 178, 180 restrict the horizontal movement of third cable support member 86 within openings 168, 170, respectively. Moreover, I-beam structures 182, 184 restrict the vertical movement of third cable support member 86 within openings 168, 170, respectively, and provide strength and support for third cable support member 86 when under a vertical load. Third cable support member 86 also includes lead-in channels 186, 188, rib 190, latch 192 and slot 194.

As also shown in FIG. 11, fourth cable support member 88 includes annular snaps 196, 198 and I-beam structures 200, 202. Annular snaps 196, 198 engage chaining plate 70 and retain fourth cable support member 88 on chaining plate 70. Annular snaps 196, 198 restrict the horizontal movement of fourth cable support member 88 within openings 166, 172, respectively. Moreover, I-beam structures 200, 202 restrict the vertical movement of fourth cable support member 88 within openings 166, 172, respectively, and provide strength and support for fourth cable support member 88 when under a vertical load.

Fourth cable support member 88 also includes lead-in channels 204, 206, rib 208, latch 210 and stop 212. Fourth cable support member 88 performs the same function as second cable support member 44. As such, lead-in channels 204, 206 funnel the second chaining plate (not shown) into proper alignment with chaining plate 70, and rib 208 engages a slot from the second chaining plate. If the second chaining plate is inserted with its hooks facing rib 208, rib 208 will not engage the slot. Thus, the slot and rib configuration prevents the second chaining plate from being improperly installed.

Figures 14, 15:
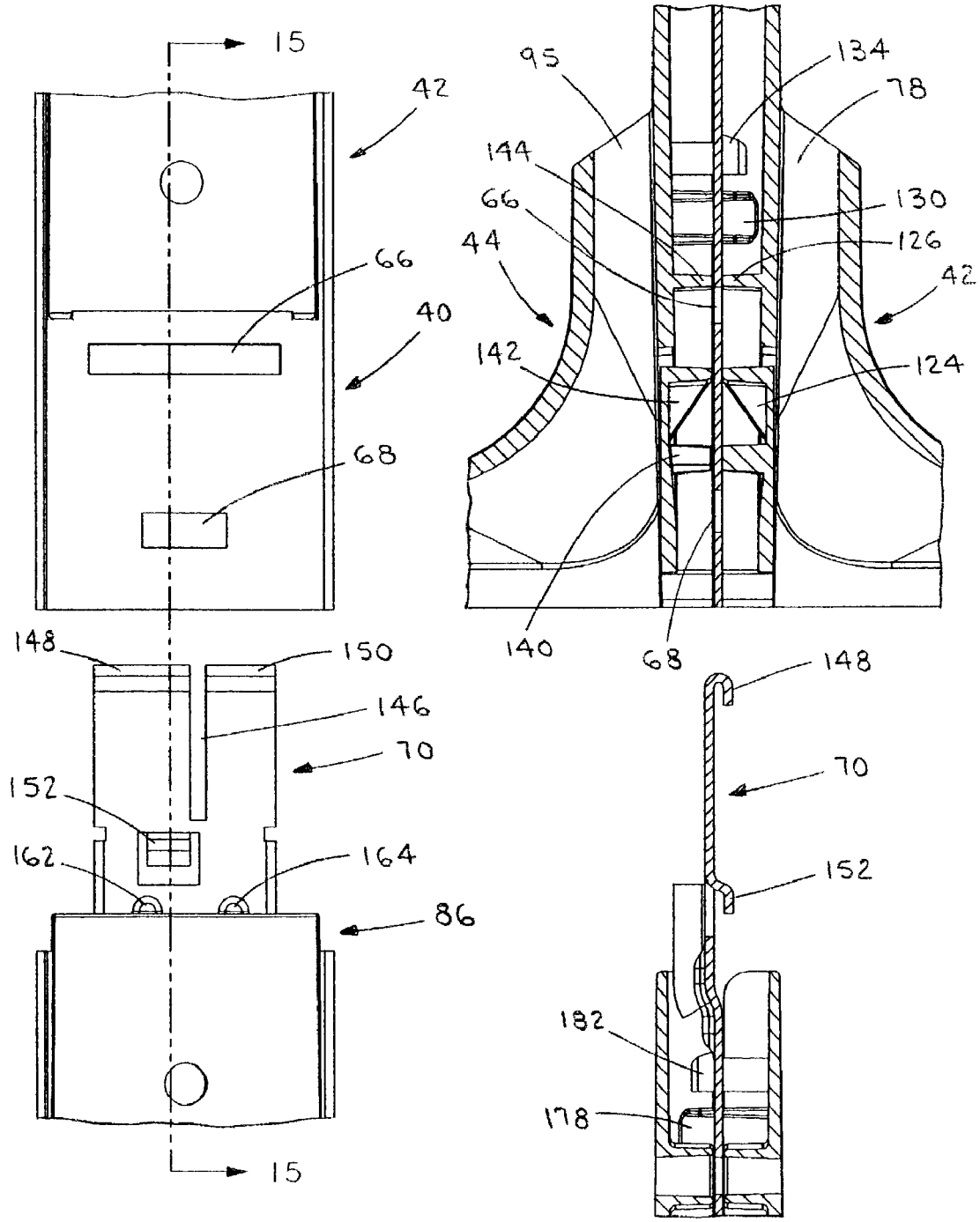
FIG. 14 is a partial cutout front view of the cable support system of FIG. 12.
FIG. 15 is a cross-sectional view taken along lines 15-15 of FIG. 14, before insertion of the chaining plate into the hanger plate.
Figure 18:
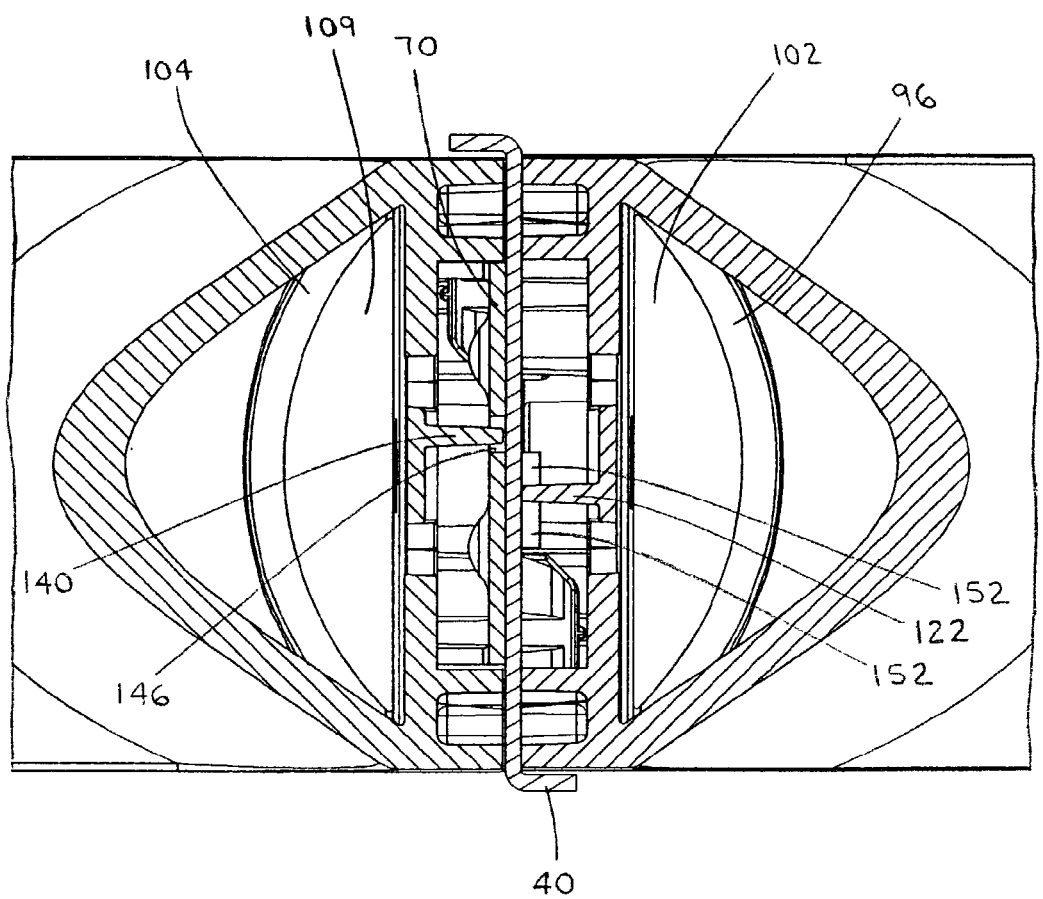
FIG. 18 is a cross-sectional view taken along lines 18-18 of FIG. 17.

FIG. 14 is a partial cutout front view of cable support system 30 shown in FIG. 12. The bottom portion of first cable support member 42 is cut away to expose slots 66, 68 of hanger plate 40, and to show the connection of chaining plate 70 to hanger plate 40. FIGS. 15-18 show cross-sectional views of first cable support member 42 and second cable support member 44 secured to hanger plate 40, and third cable support member 86 and fourth cable support member 88 secured to chaining plate 70. Moreover, FIGS. 17 and 18 show chaining plate 70 secured to hanger plate 40.

FIG. 15 is a cross-sectional view of FIG. 14, before insertion of chaining plate 70 into hanger plate 40. As shown in FIG. 16, as chaining plate 70 is inserted into hanger plate 40, lead-in channels 136, 138 (see FIG. 11) funnel chaining plate 70 into proper alignment with hanger plate 40. As a result, rib 140 engages slot 146. If chaining plate 70 is inserted with hooks 148, 150, 152 facing rib 140, rib 140 will not engage slot 146. Thus, the slot and rib configuration prevents chaining plate 70 from being improperly installed.

As best seen in FIGS. 16 and 17, latch 142 facilitates engagement between chaining plate 70 and hanger plate 40. As chaining plate 70 moves toward hanger plate 40, latch 142 provides a spring pressure which pushes hooks 148, 150 into slot 66 and hook 152 into slot 68. As shown in FIG. 17, second cable support member 44 has a stop 144 for guiding hooks 148, 150 into slot 66.

Figure 21:
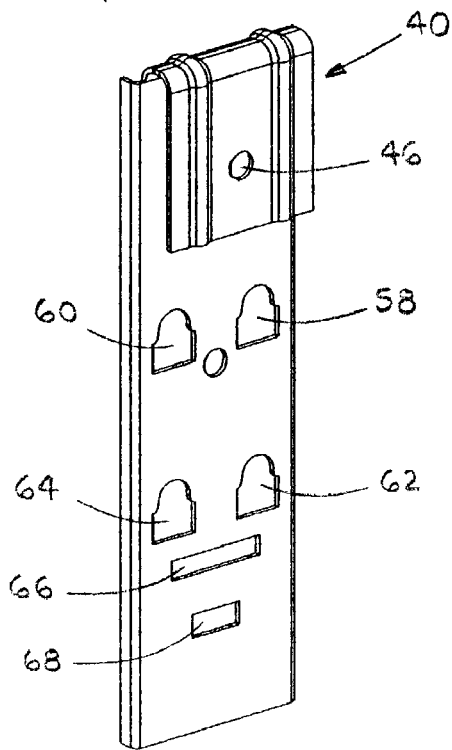
FIG. 21 is a rear perspective view of the hanger plate of FIG. 20.

FIGS. 20-22 show hanger plate 40 secured to ladder rack 38. Apertures 46, 48 are axially aligned on opposite sides of ladder rack 38. However, in all other respects, hanger plate 40 is identical to and performs the same function as the hanger plate shown in FIGS. 1-18.

Figure 23A:
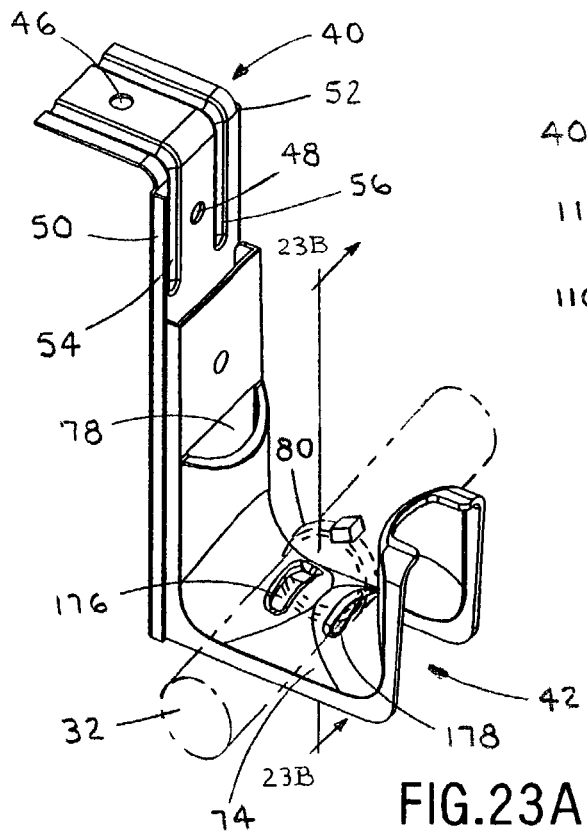
FIG. 23A is an alternate embodiment of the cable support member of FIG. 4.
Figure 23B:
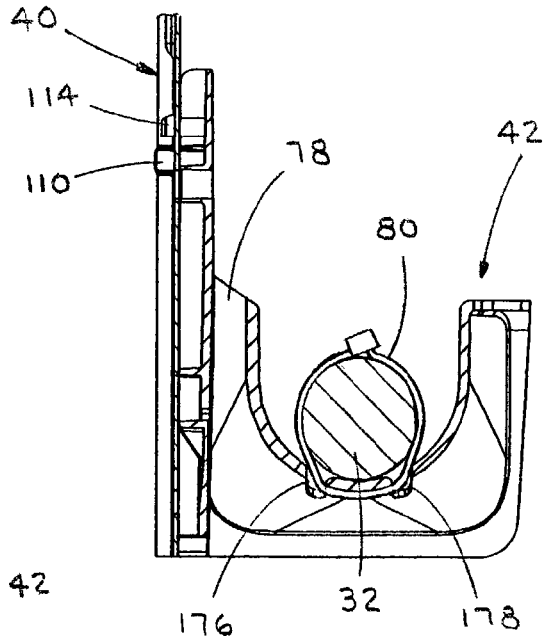
FIG. 23B is a cross-sectional view taken along lines 23B-23B of FIG. 23A.
Figure 23C:
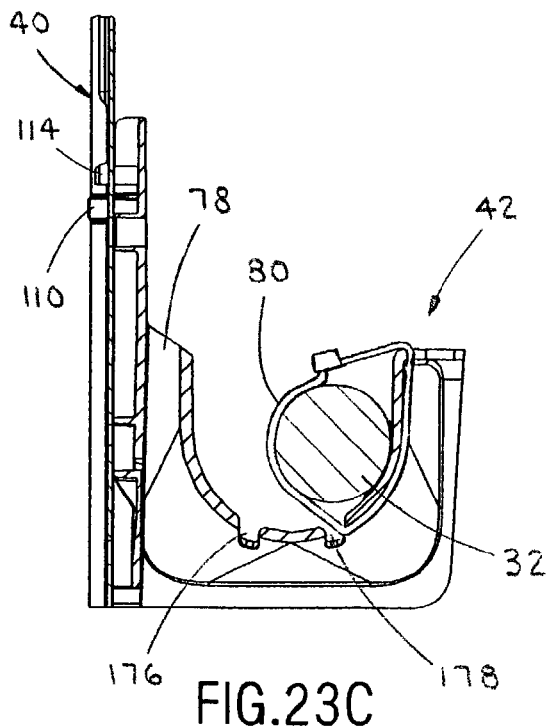
FIGS. 23C-F are cross-sectional views similar to FIG. 23B, utilizing various cable tie arrangements to secure cable within the cable support member.
Figure 23D:
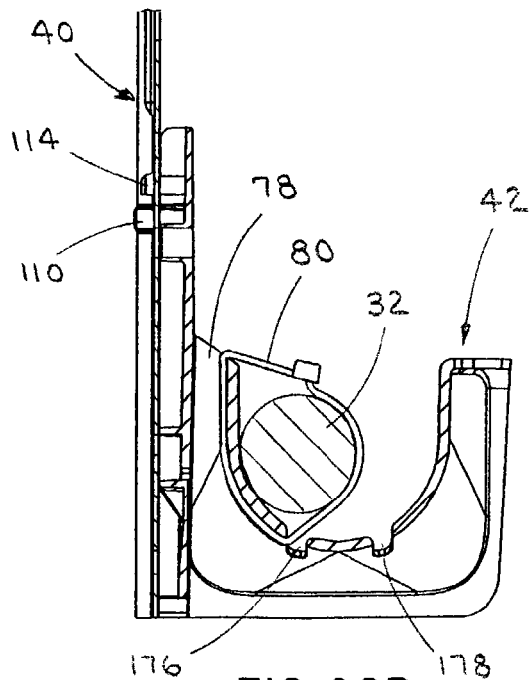
Figure 23E:
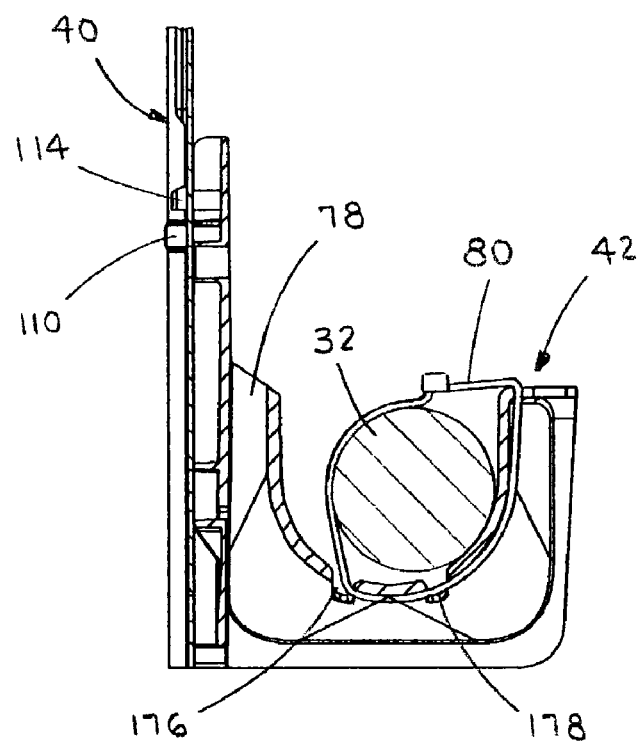
Figure 23F:
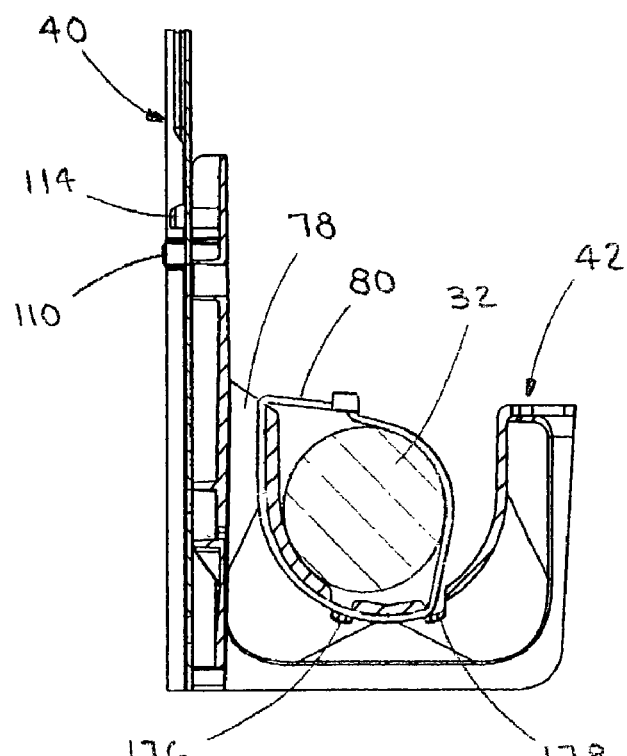

As shown in FIG. 23A, support surface 74 of first cable support member 42 has slots 176, 178 for routing a cable retainer, such as cable tie 80, within first cable support member 42 to secure cables 32 therein. FIGS. 23B-F show first cable support member 42 utilizing various cable tie arrangements to secure small, medium and large size bundles of cable 32 within first cable support member 42. It is likewise contemplated that support surfaces 92, 98 and 106 each have two slots for routing a cable tie within second, third and fourth cable support members 44, 86 and 88, respectively, to secure cables therein.

In operation, hanger plate 40 is secured to I-beam 36 via I-beam clamp bracket 34. Alternatively, hanger plate 40 may be secured directly to ladder rack 38, as shown in FIGS. 20 and 22. First cable support member 42 is attached to one side of hanger plate 40, and second cable support member 44 is attached to the other side of hanger plate 40. As shown in FIG. 12, chaining plate 70 is inserted into hanger plate 40 by an upward motion. Lead-in channels 136, 138 funnel chaining plate 70 into position for attachment to hanger plate 40, and latch 142 provides a spring pressure which pushes hooks 148, 150 into slot 66 and hook 152 into slot 68. Hooks 148, 150, 152 secure chaining plate 70 into hanging plate 40 with a downward pulling motion. Moreover, third cable support member 86 is attached to one side of chaining plate 70 and fourth cable support member 88 is attached to the other side of chaining plate 70. If more than two tiers are required in cable support system 30, the second chaining plate (not shown) can be attached to chaining plate 70, and additional cable support members can be attached to each side of the second chaining plate. This process can be continued until the requisite cable support member capacity is achieved.

The disclosed invention provides a multi-tiered system for supporting high-performance cabling. The cable support system includes a hanger plate securable to a structure, a chaining plate attachable to the hanger plate, and a first cable support member attachable to the hanger plate or the chaining plate. It should be noted that the above-described and illustrated embodiments and preferred embodiments of the invention are not an exhaustive listing of the forms such a cable support system in accordance with the invention might take; rather, they serve as exemplary and illustrative of embodiments of the invention as presently understood. By way of example, and without limitation, a cable support system having more than two chaining plates is contemplated to be within the scope of the invention. Many other forms of the invention are believed to exist.

The invention claimed is:

1. A cable support system comprising:
   a hanger plate securable to a structure:
   a first cable support member directly attachable to the hanger plate; and
   a chaining plate attachable to the hanger plate without removing the first cable support member from the hanger plate, the chaining plate accommodating a plurality of cable support members,
   wherein the first cable support member comprises a first leg, a second leg and a third leg, the first leg having mounting means on a back side for attaching to the hanger plate, the second leg having a cable support surface, and the third leg having a cable retention surface.

2. The cable support system of claim 1 wherein the hanger plate has at least one opening for receiving the first cable support member.

3. The cable support system of claim 1 wherein the hanger plate has at least one slot for receiving at least one hook from the chaining plate.

4. The cable support system of claim 1 wherein the hanger plate accommodates at least three cable support members.

5. The cable support system of claim 1 wherein the first cable support member has at least one protruding member for engaging the hanger plate and retaining the first cable support member on the hanger plate, the at least one protruding member comprises an annular snap and an I-beam structure.

6. The cable support system of claim 1 wherein the first cable support member has a rib for mating with the chaining plate.

7. The cable support system of claim 1 wherein the first cable support member has at least one lead-in channel for facilitating engagement between the chaining plate and the hanger plate.

8. The cable support system of claim 1 wherein the first cable support member has a latch and a stop, each for facilitating engagement between the chaining plate and the hanger plate.

9. The cable support system of claim 1 wherein the first cable support member has a slot for routing a cable tie around the first cable support member to secure cables therein.

10. The cable support system of claim 1 wherein the cable support surface has two slots for routing a cable tie within the first cable support member to secure cables therein.

11. The cable support system of claim 1 wherein the chaining plate has at least one hook for engaging the hanger plate.

12. The cable support system of claim 1 wherein the chaining plate has at least one opening for receiving a second cable support member.

13. The cable support system of claim 1 including a second cable support member positioned in back-to-back alignment with the first cable support member.

14. The cable support system of claim 13 further including a third cable support member positioned in vertical alignment with the first cable support member or the second cable support member.

15. The cable support system of claim 1 including a second cable support member positioned in vertical alignment with the first cable support member.

16. The cable support system of claim 15 further including a third cable support member positioned in back-to-back alignment with the first cable support member or the second cable support member.

17. A cable support system comprising:
a hanger plate securable to a structure;
a first cable support member directly attachable to the hanger plate, wherein the first cable support member has at least one protruding member for engaging the hanger plate and retaining the first cable support member on the hanger plate; and
a chaining plate attachable to the hanger plate without removing the first cable support member from the hanger plate, the chaining plate accommodating a plurality of cable support members.

18. The cable support system of claim 17 wherein the hanger plate has at least one opening for receiving the first cable support member.

19. The cable support system of claim 18 wherein the hanger plate has four openings.

20. The cable support system of claim 17 wherein the hanger plate has at least one slot for receiving at least one hook from the chaining plate.

21. The cable support system of claim 20 wherein the hanger plate has a first slot and a second slot, the first slot being wider than the second slot.

22. The cable support system of claim 17 wherein the hanger plate accommodates at least three cable support members.

23. The cable support system of claim 17 wherein the at least one protruding member comprises an annular snap and an I-beam structure.

24. The cable support system of claim 17 wherein the first cable support member has a first protruding member and a second protruding member, the first protruding member being substantially identical to the second protruding member.

25. The cable support system of claim 17 wherein the first cable support member has a rib for mating with the chaining plate.

26. The cable support system of claim 17 wherein the first cable support member has at least one lead-in channel for facilitating engagement between the chaining plate and the hanger plate.

27. The cable support system of claim 26 wherein the first cable support member has a first lead-in channel and a second lead-in channel, the first channel being substantially identical to the second channel.

28. The cable support system of claim 17 wherein the first cable support member has a latch for facilitating engagement between the chaining plate and the hanger plate.

29. The cable support system of claim 17 wherein the first cable support member has a stop for facilitating engagement between the chaining plate and the hanger plate.

30. The cable support system of claim 17 wherein the first cable support member has a slot for routing a cable retainer around the first cable support member to secure cables therein.

31. The cable support system of claim 30 wherein the cable retainer is a cable tie.

32. The cable support system of claim 17 wherein the chaining plate has at least one hook for engaging the hanger plate.

33. The cable support system of claim 32 wherein the chaining plate has a first hook, a second hook and a third hook.

34. The cable support system of claim 17 wherein the chaining plate has at least one opening for receiving a second cable support member.

35. The cable support system of claim 34 wherein the chaining plate has four openings.

36. The cable support system of claim 17 including a second cable support member positioned in back-to-back alignment with the first cable support member.

37. The cable support system of claim 36 further including a third cable support member positioned in vertical alignment with the first cable support member or the second cable support member.

38. The cable support system of claim 17 including a second cable support member positioned in vertical alignment with the first cable support member.

39. The cable support system of claim 38 further including a third cable support member positioned in back-to-back alignment with the first cable support member or the second cable support member.

40. The cable support system of claim 1 including a second chaining plate attachable to the chaining plate.

41. The cable support system of claim 17 including a second chaining plate attachable to the chaining plate.

42. A cable support system comprising:
a hanger plate securable to a structure;
a first cable support member directly attachable to the hanger plate; and a chaining plate attachable to the hanger plate without removing the first cable support member from the hanger plate, the chaining plate accommodating a plurality of cable support members;

wherein the first cable support member has a rib for mating with the chaining plate.

43. A cable support system comprising:

a hanger plate securable to a structure;

a first cable support member directly attachable to the hanger plate; and a chaining plate attachable to the hanger plate without removing the first cable support member from the hanger plate, the chaining plate accommodating a plurality of cable support members;

wherein the first cable support member has at least one lead-in channel for facilitating engagement between the chaining plate and the hanger plate.

44. The cable support system of claim 43 wherein the first cable support member has a first lead-in channel and a second lead-in channel, the first channel being substantially identical to the second channel.

45. A cable support system comprising:

a hanger plate securable to a structure;

a first cable support member directly attachable to the hanger plate;

a second cable support member positioned in back-to-back alignment with the first cable support member; and a chaining plate attachable to the hanger plate without removing the first cable support member from the hanger plate, the chaining plate accommodating a plurality of cable support members.

46. The cable support system of claim 45 further including a third cable support member positioned in vertical alignment with the first cable support member or the second cable support member.

47. A cable support system comprising:

a hanger plate securable to a structure;

a first cable support member directly attachable to the hanger plate;

a second cable support member positioned in vertical alignment with the first cable support member; and a chaining plate attachable to the hanger plate without removing the first cable support member from the hanger plate, the chaining plate accommodating a plurality of cable support members.

48. The cable support system of claim 47 further including a third cable support member positioned in back-to-back alignment with the first cable support member or the second cable support member.

* * * * *